April 5, 1932. W. H DINGER 1,851,978
TIRE PRESSURE GAUGE
Filed Aug. 15, 1930 3 Sheets-Sheet 1
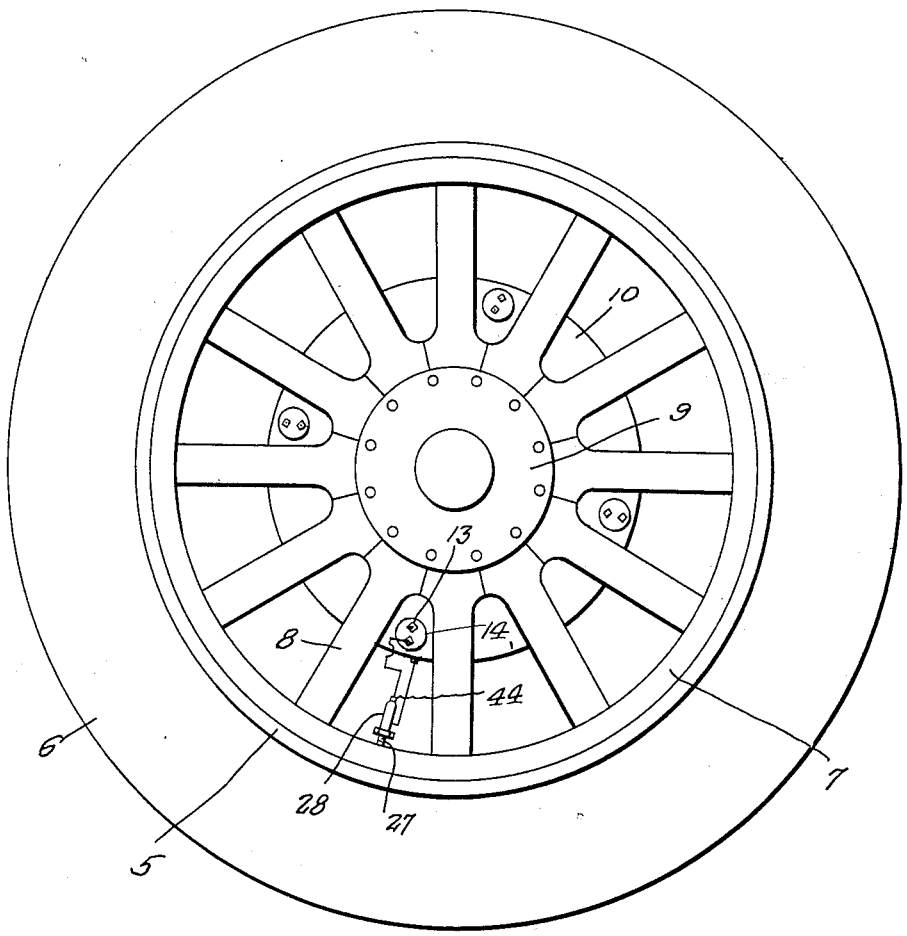
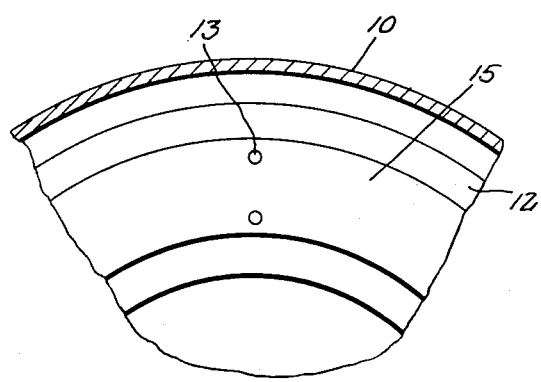
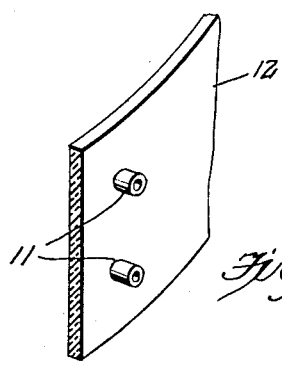
Inventor
William H. Dinger,
By Clarence A. O'Brien
Attorney April 5, 1932.  W. H. DINGER  1,851,978
TIRE PRESSURE GAUGE
Filed Aug. 15, 1930   3 Sheets-Sheet 2

Inventor
William H. Dinger,
By Clarence A. O'Brien
Attorney

April 5, 1932.  W. H. DINGER  1,851,978

TIRE PRESSURE GAUGE

Filed Aug. 15, 1930   3 Sheets-Sheet 3

Inventor
William H. Dinger,

By Clarence A. O'Brien
Attorney

Patented Apr. 5, 1932

1,851,978

UNITED STATES PATENT OFFICE

WILLIAM H. DINGER, OF MIAMI SHORES, FLORIDA

TIRE PRESSURE GAUGE

Application filed August 15, 1930. Serial No. 475,486.

This invention appertains to new and useful improvements in pressure gauges whereby the air pressure in the tires of a vehicle can be ascertained conveniently by the driver without leaving his seat.

The principal object of the invention is to provide a dash board gauge for ascertaining the exact pressure in each of the tires of the vehicle regardless if in motion or standing still.

During the course of the following specification and claim, other important objects and advantages of the invention will readily become apparent to the reader.

In the drawings:—

Figure 1 represents a side elevational view of a vehicle wheel showing the elements of the present invention installed thereon.

Fig. 4 represents a sectional view taken substantially on the line 4—4 of Fig. 2.

Fig. 7 represents a fragmentary perspective view of the di-electric annulus on the inner side of the brake drum.

Figure 2:
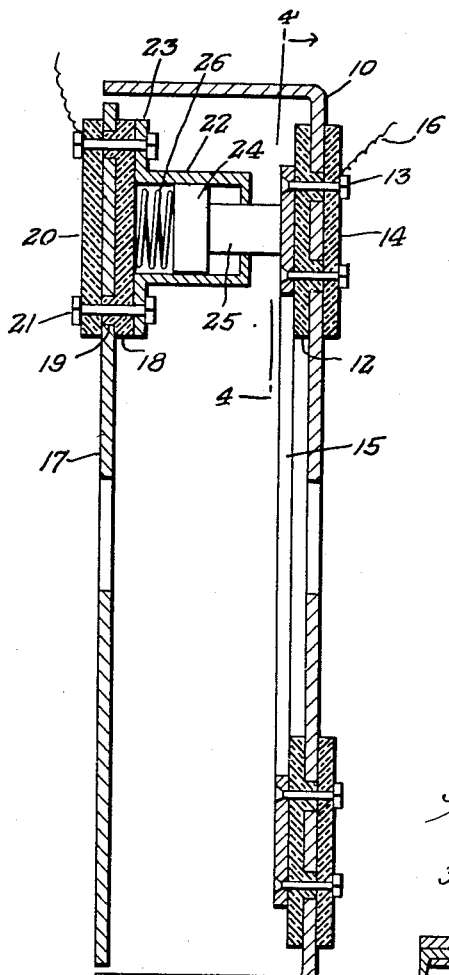
Fig. 2 represents a vertical sectional view through the brake drum housing showing the novel electrical connectors between the brake drum and a movable part of the brake.
Figure 3:
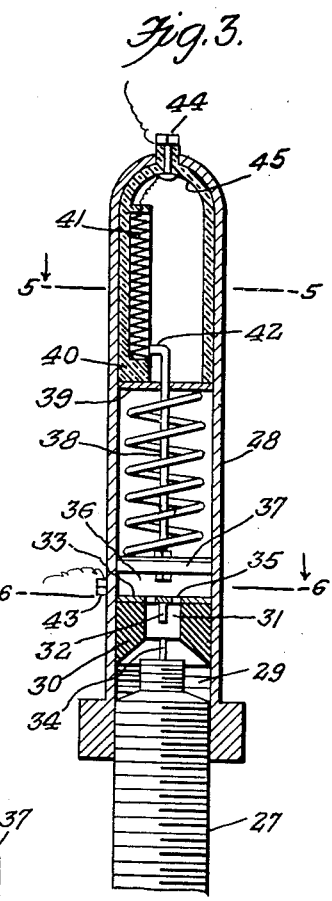
Fig. 3 represents a fragmentary vertical sectional view through the rheostat means on the valve of one of the wheels.
Figure 9:
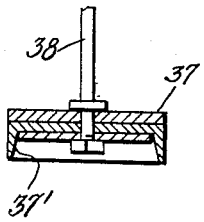
Fig. 9 is a vertical sectional view of the actuating piston.
Figure 5:
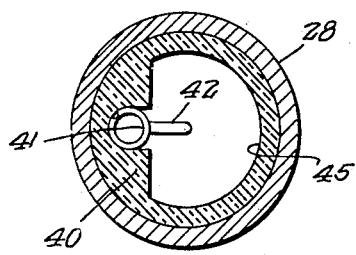
Fig. 5 represents a cross sectional view taken substantially on the line 5—5 of Fig. 3.
Figure 6:
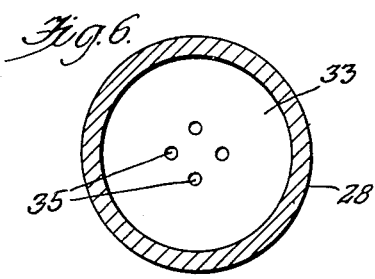
Fig. 6 represents a cross sectional view taken substantially on the line 6—6 of Fig. 3.

Referring to the drawings, wherein like numerals designate like parts, it can be seen that numeral 5 represents a rim on which the tire 6 is mounted. Numeral 7 represents the wheel felly while spokes 8 are interposed between the felly 7 and the hub 9.

In carrying out the present invention, the brake housing 10 is provided with pairs of radially spaced openings at predetermined spaced intervals through which the nipples 11 on the di-electric annulus 12 protrude. Bores extend through the annulus 12 and the nipple 11 to receive the pin 13, the ends extending through openings in the ring-like di-electric member 14 whereby these di-electric members are secured against opposite sides of the housing 10 as in the manner shown in Fig. 2 and an annular conductor ring 15 is secured to the annulus 12 by the same ends or bolts 13, and to the outer ends of these ends or bolts may be connected the conductors 16.

The numeral 17 designates the inside cover of the brake drum housing provided with a plate 18 having nipples 19 disposed through openings in the cover 17 to abut the plate 19 on the opposite side of the cover 17 from the plate 19, both of the plates 19 and 20 being of di-electric material.

Bolts 21 pass through the plates 18 and 20 through the nipples 19 for securing these plates against opposite sides of the cover 17. A barrel or cylinder 22 is provided with a circumferentially extending flange 23 at one end which is secured to the plate 18 by the aforementioned bolt 21.

Operative within the cylinder 22 is a copper clad brush 25 extending therefrom and through the opening in the end of the cylinder 22 from the flange 23. A spring 26 is interposed between the brush 25 and the plate 18 for projecting the brush 25 so that the protuberance will wipe against the conductor ring 15.

Communicating with the pneumatic tube of the wheel is the valve 27 and engageable with this valve 27 is a barrel 28 interiorly threaded as at 29 for engaging the threads of the valve 27. The barrel 28 has a rubber cushion 30 therein, with a bore 31 extending therethrough. A pin 32 depends from the plate 33 for engagement with the usual valve stem 34, and said plate 33 being provided with openings 35 therein through which air can pass to the chamber 36 within which the piston head 37 is operative. The piston head 37 is provided with a leather cap packing 37'.

The piston head 37 has a stem or rod 38 extending therefrom which extends upwardly through the partition 39. Mounted within the space above the partition 39 is the block 40 in which the resistant element 41 is mounted, against which the laterally bent end 42 of the rod 38 is adapted to wipe. One of the wires of the system connects to the barrel 28 as at 43 while its second wire extends from the upper end of the resistant element 41 to the binding post 44, the interior of the compartment above the partition 39 being lined by a di-electric material 45.

Figure 8:
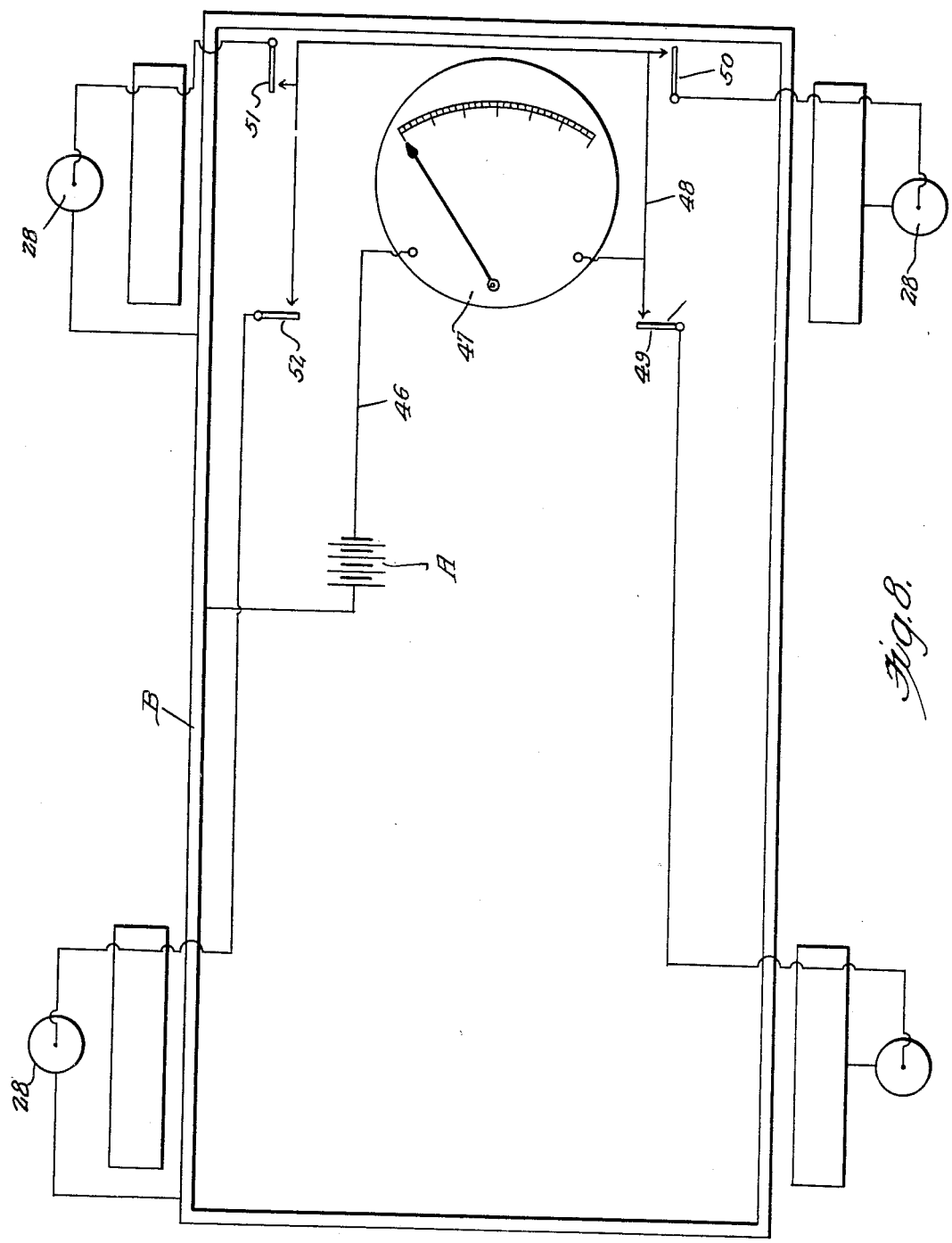
Fig. 8 represents a diagrammatic view disclosing the electrical connection between the electrical devices involved.

As is clearly shown in Fig. 8, A represents the battery with the negative side thereof grounded to the frame B of the vehicle. The opposite side of the battery has a lead 46 which extends to one side of the cylindrical measuring instrument 47 which is an electric meter calibrated in pounds to indicate the pressure of the air in the tires. The opposite side of the gauge 47 has a line 48 extending to the switches 49, 50, 51 and 52.

Obviously, by closing any one of these switches, current will pass through the resistance elements 41 on the valve, through the conductor ring 15 and brush 25 through the particular switch closed to the gauge 47, resulting in the indication of the gauge of the amount of pressure in pounds in the corresponding tire.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:

In a tire pressure indicator device and in combination with the valve stem and valve of a tire, a shell connected with the stem and having a part therein for engaging the valve to move the same to open position when the shell is placed on the stem, a piston in the shell acted on by the air in the tire when the valve is opened, a partition in the shell dividing the same into inner and outer chambers, a rod connected with the piston and passing through the partition, a spring for resisting movement of the piston by the tire pressure, a lining of non-conducting material in the outer chamber, and having a recess therein, a resistance in said recess, the free end of the piston rod being bent to form a brush to move over the resistance when the piston is moved, and an indicator circuit connected with the shell and with the resistance.

In testimony whereof I affix my signature.

WILLIAM H. DINGER.